US012682282B1

(12) United States Patent (10) Patent No.: US 12,682,282 B1

Ganapathiraman et al. (45) Date of Patent: Jul. 14, 2026

(54) ACCELERATED TRANSFER LEARNING

(71) Applicant: Amazon Technologies, Inc., Seattle, WA (US)

(72) Inventors: Vignesh Ganapathiraman, Bothell, WA (US); Anila Joshi, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 812 days.

(21) Appl. No.: 18/066,706

(22) Filed: Dec. 15, 2022

(51) Int. Cl.
*G06N 20/00* (2019.01)

(52) U.S. Cl.
CPC ..................................... *G06N 20/00* (2019.01)

(58) Field of Classification Search
CPC ........... G06N 3/096; G06N 3/02; G06N 20/20
See application file for complete search history.

(56) References Cited

U.S. PATENT DOCUMENTS

2022/0164701 A1* 5/2022 Shrivastava .............. G06N 3/10

OTHER PUBLICATIONS

Misra U, Liaw R, Dunlap L, Bhardwaj R, Kandasamy K, Gonzalez JE, Stoica I, Tumanov A. Rubberband: cloud-based hyperparameter tuning. InProceedings of the Sixteenth European Conference on Computer Systems Apr. 21, 2021 (pp. 327-342). (Year: 2021).*

Amelie Royer, Christoph Lampert; Proceedings of the IEEE/CVF Winter Conference on Applications of Computer Vision (WACV), 2020, pp. 2191-2200 (Year: 2020).*

Shabbir, Amsa, et al. "Satellite and scene image classification based on transfer learning and fine tuning of ResNet50." Mathematical Problems in Engineering 2021.1 (2021): 5843816. (Year: 2021).*

Sreekanth, Pavan, et al. "Head pose estimation using transfer learning." 2018 International Conference on Recent Trends in Advance Computing (ICRTAC). IEEE, 2018. (Year: 2018).*

Velu, Akash, Samar Khanna, and Skanda Vaidyanath. "Differentiable Weight Masks for Domain Transfer.", https://cs231n.stanford.edu/reports/2022/pdfs/140.pdf (Year: 2022).*

Misra, Ujval, et al. "Rubberband: cloud-based hyperparameter tuning." Proceedings of the Sixteenth European Conference on Computer Systems. 2021. (pp. 327-342). (Year: 2021).*

* cited by examiner

Primary Examiner — Vincent Gonzales

Assistant Examiner — Pedro J Morales

(74) *Attorney, Agent, or Firm* — Nicholson De Vos Webster & Elliott LLP

(57) ABSTRACT

Techniques for updating a model are described. An example includes determining a proper subset of weights of a first trained machine learning (ML) model to change during an optimization procedure; updating only the proper subset of weights of a second ML model on a first source dataset to generate an optimized ML model; and storing the optimized ML model.

20 Claims, 10 Drawing Sheets

WEIGHTS OF A TRAINED MODEL 301

PROPER SUBSET OF THE WEIGHTS TO BE CHANGED 303

400

▼ REGION-US-EAST        & USER:    COMPANY-X

MODEL TRAINING SERVICE

OPTIMIZATION OF AN EXISTING MODEL

CREATE AN OPTIMIZED MODEL

SOURCES                                                    401

| | |
|---|---|
| MODEL LOCATION(S) | URL(S) |
| TRAINING DATA | URL |

DESTINATION (TARGET)

403

| | |
|---|---|
| MODEL LOCATION | URL |
| PARAMETERS | VALUE, PERCENTAGE |
| OPTIMIZATION TYPE | TYPE |
| ACCURACY THRESHOLD | VALUE |
| NUMBER OF ITERATIONS | VALUE |
| CRITERIA FOR SELECTING PARAMETERS | CRITERIA CHOICE |
| ALGORITHM FOR SELECTING PARAMETERS | ALGORITHM |
| SELECTIVE NODE DISABLEMENT | YES/NO |

COMPUTE INSTANCE(S)

| | |
|---|---|
| INSTANCE TYPE | NORMAL.R1.XLARGE ▼ |
| OPERATING SYSTEM | LINUX ENTERPRISE SERVER 15 ▼ |
| TARGET | ARM, X86, NVIDIA |

405

[ CANCEL ]    [ OPTIMIZE ]

*FIG. 4*

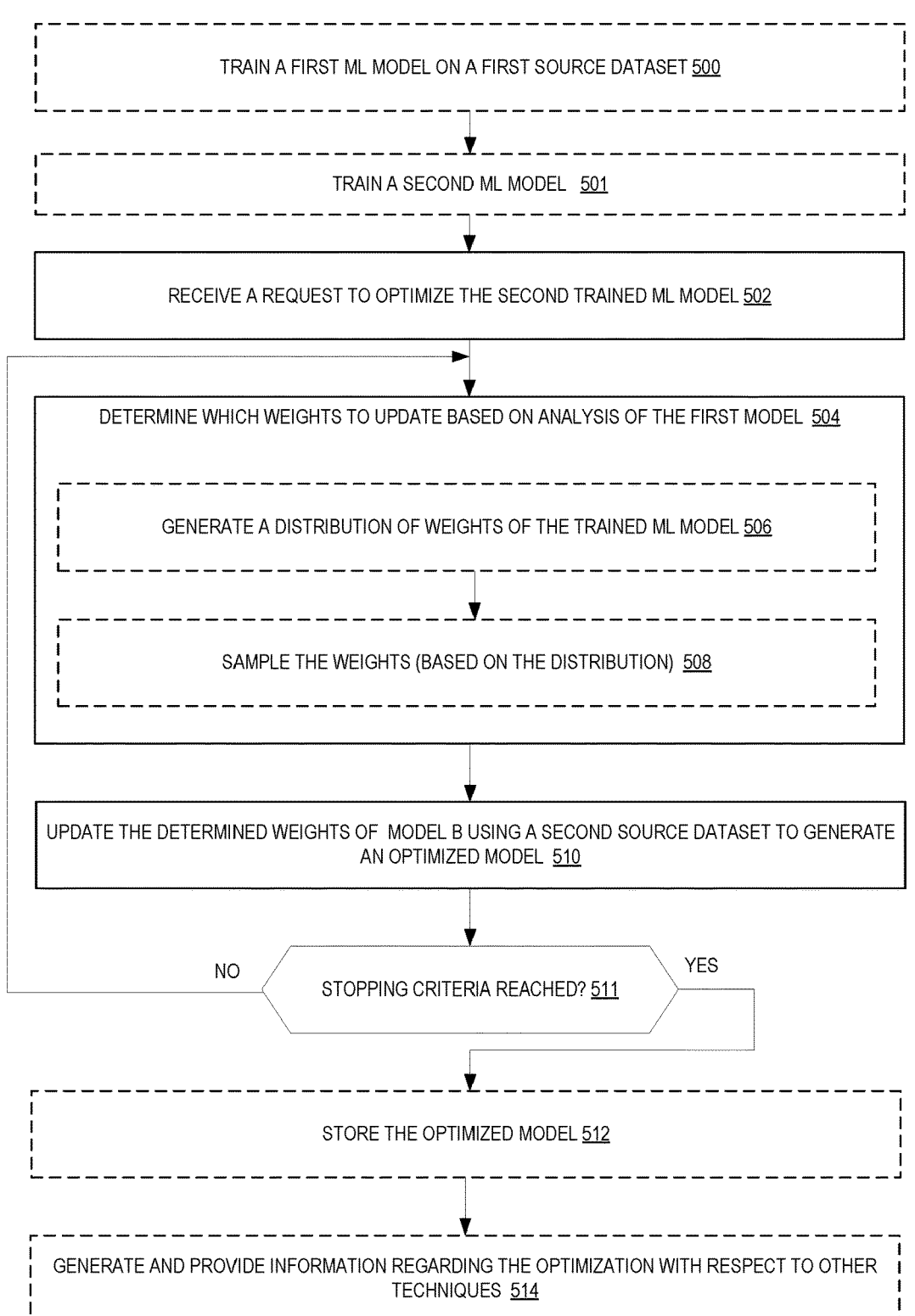

TRAIN A FIRST ML MODEL ON A FIRST SOURCE DATASET 500

TRAIN A SECOND ML MODEL  501

RECEIVE A REQUEST TO OPTIMIZE THE SECOND TRAINED ML MODEL 502

DETERMINE WHICH WEIGHTS TO UPDATE BASED ON ANALYSIS OF THE FIRST MODEL  504

GENERATE A DISTRIBUTION OF WEIGHTS OF THE TRAINED ML MODEL 506

SAMPLE THE WEIGHTS (BASED ON THE DISTRIBUTION) 508

UPDATE THE DETERMINED WEIGHTS OF  MODEL B USING A SECOND SOURCE DATASET TO GENERATE AN OPTIMIZED MODEL  510

NO　　STOPPING CRITERIA REACHED? 511　　YES

STORE THE OPTIMIZED MODEL 512

GENERATE AND PROVIDE INFORMATION REGARDING THE OPTIMIZATION WITH RESPECT TO OTHER TECHNIQUES 514

*FIG. 5*

ACCELERATED TRANSFER LEARNING

BACKGROUND

Transfer learning (or fine-tuning or optimization) is one of the primary ways deep learning is employed in modern applications. Transfer learning typically involves first training a (task-specific) machine learning ML model with sufficiently large capacity on a large (often publicly available) "source" dataset $X_s$ until convergence (typically this is called "pre-training"). To effectively use this model on a custom "target" dataset $X_T$ for the same task, the model is typically trained again, after loading the pre-trained weights from training on $X_s$, on the target dataset $X_T$ which is typically much smaller than the source dataset until convergence (or slightly before that).

BRIEF DESCRIPTION OF DRAWINGS

Various examples in accordance with the present disclosure will be described with reference to the drawings, in which:

FIG. 4 illustrates examples of a graphical user interface to be used by a user to request optimization of a ML model.

FIG. 5 is a flow diagram illustrating operations of a method for at least optimizing a ML model according to some examples.

DETAILED DESCRIPTION

The present disclosure relates to methods, apparatus, systems, and non-transitory computer-readable storage media for optimizing a machine learning model. Fine-tuning works well when the $X_s$ and $X_T$ datasets are distributionally close to each other. However, when they are different (often called a covariate shift problem), the training of the model will spend a significant amount of training cycles in "transferring" the model's weights to the target dataset, leading to slower convergence. This is especially evident in the context of hyperparameter optimization (HPO) which involves performing several such fine-tuning operations.

Instead of fine-tuning or optimizing, a different approach is to train a model from scratch without using any of the knowledge obtained pre-training.

Detailed herein are examples of a transfer learning which makes use of pre-trained model weights. Model weights generally indicate which connections are useful for a given task. In some of these examples, a model is optimized on $X_T$, but the optimization uses the pre-trained weights to guide which weights (parameters) to optimize. This enables the model to quickly learn concepts on the target dataset by focusing on a proper subset of weights. Because the optimization does not involve all of the weights the training model does not waste unnecessary training cycles in unlearning "non-transferrable" signals from $X_s$ which enables a convergence earlier.

A machine learning model trained with this optimization can converge to a "low" training loss quicker than other standard optimizers such as stochastic gradient descent (SGD) or adaptive moment estimation (Adam) or training from scratch.

Figure 1:
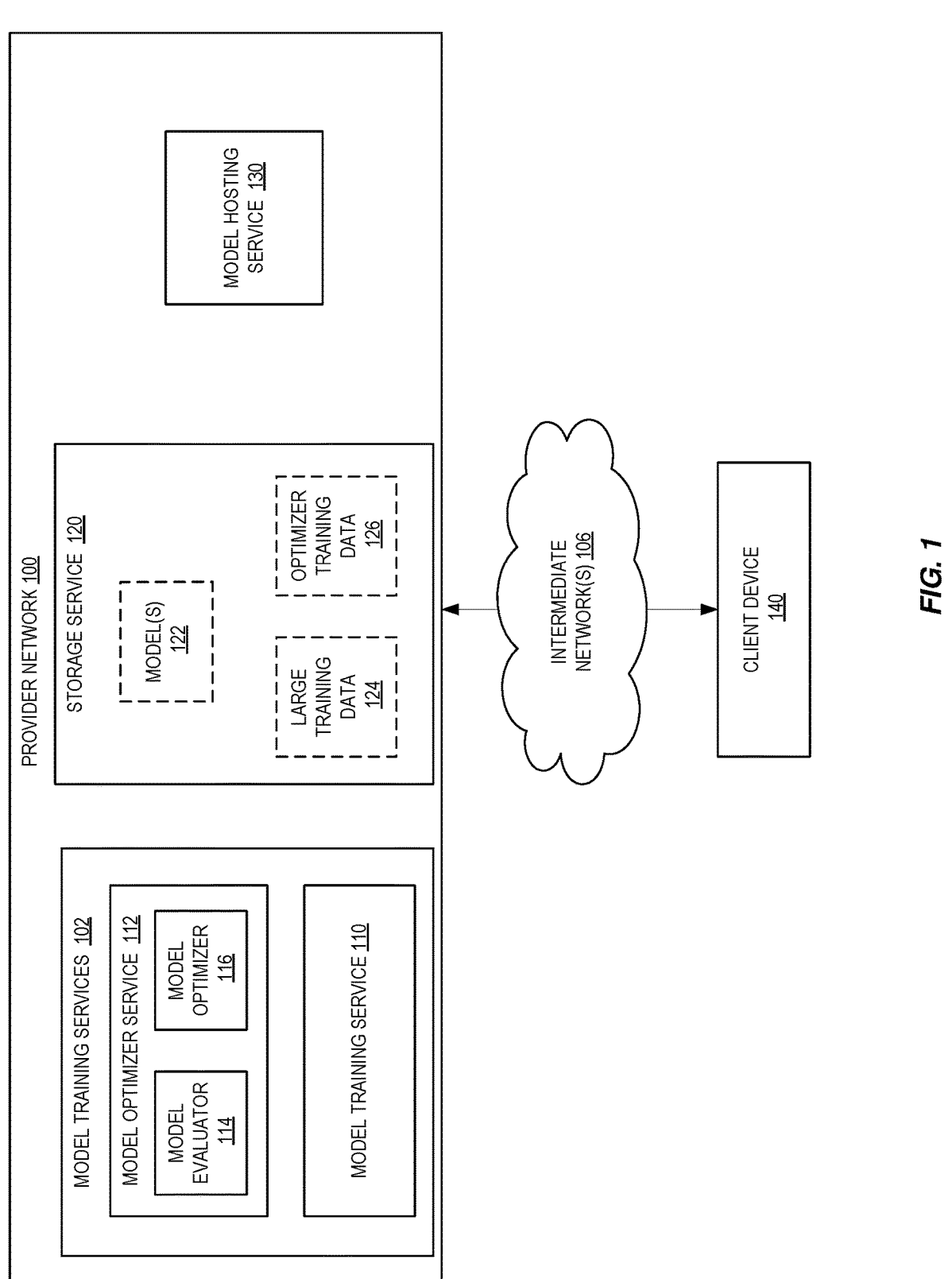
FIG. 1 illustrates examples including a model optimizer service.

FIG. 1 illustrates examples including a model optimizer service. In this illustration, model training services 102 of a provider network 100 include a model training service 110 to train a ML model and a model optimizer service 112 to optimize a trained model. In some examples, the model optimizer service 112 is a part of the model training service 110.

The model training service 110 may be used to train a model on a relatively large dataset to generate a more "generic" model for a particular task. The dataset may be stored in storage service 120 as a part of training data 124. The storage service 120 may also be used to store any generated model(s) 122.

The model optimizer service 112 optimizes existing models. Examples of acts this service performs to do this optimization are detailed elsewhere. In some examples, an optimizer training dataset 126 is stored in the storage service 120. The storage service 120 may also be used to store any optimized model(s) 122.

In some examples, the provider network 100 includes a model hosting service 130 to host a model such as the model(s) 120.

A user may interact using a client device 140 with one or more services of the provider network 100. The interaction may be the use of a hosted model, requesting the training of a model, and/or requesting the optimization of a trained model.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

Figures 2A, 2B, 2C, 2D:
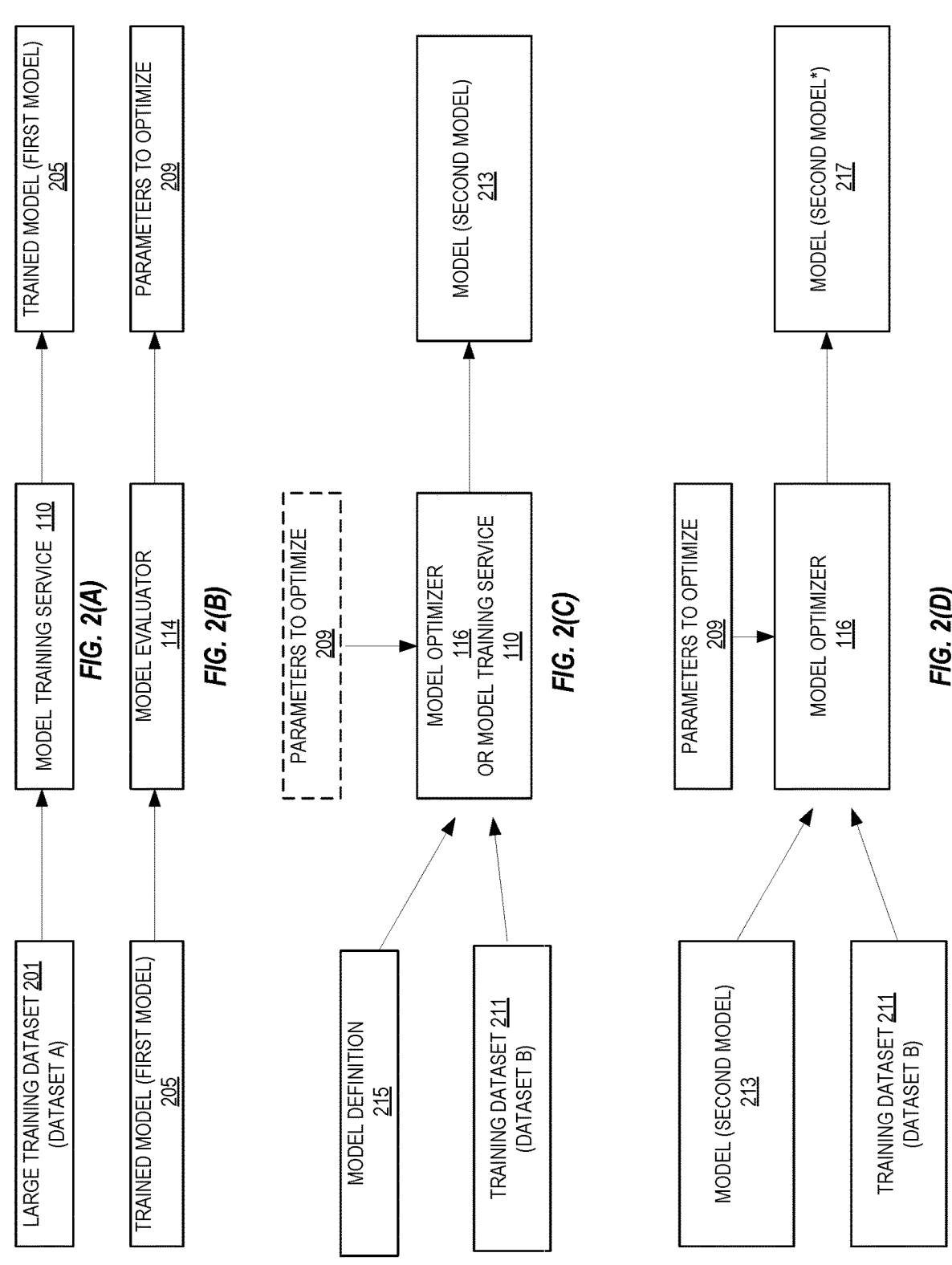
FIGS. 2(A)-(D) illustrate examples of a model training and tuning flow.

FIGS. 2(A)-(D) illustrate examples of a model training and tuning flow. FIG. 2(A) illustrates examples of model training. In particular, this illustrates the pre-training of a model. A large training dataset 201 (such as a public image dataset) is provided as a training source to a model training service 110 to generate a first trained model 205. What type of model is trained, etc. is determined by one or more requests to the model training service 110.

FIG. 2(B) illustrates examples of discovering parameters to optimize. The first trained model 205 is subjected to a model evaluator 114 which determines a proper subset of weights of the trained model 205 (shows as parameters to optimize 209) to use in an optimization of a model. This proper subset of weights are to be potentially updated with the rest of the weights being locked during optimization. This determination may happen in several ways. In some examples, a normalized distribution is generated and sampled. For example, when $W_s$ is the pre-trained weights, a normalized distribution $W_{sNorm}$ may be found by softmax $(W_s/|W_s|)$ and $W_{sNorm}$ sampled. The sampling may be done in any number of ways including random, pseudorandom, etc. In some examples, absolute values are determined and then sampled. In some examples, an input to the model evaluator 114 is the number of weights to use in the optimization.

Figure 3:
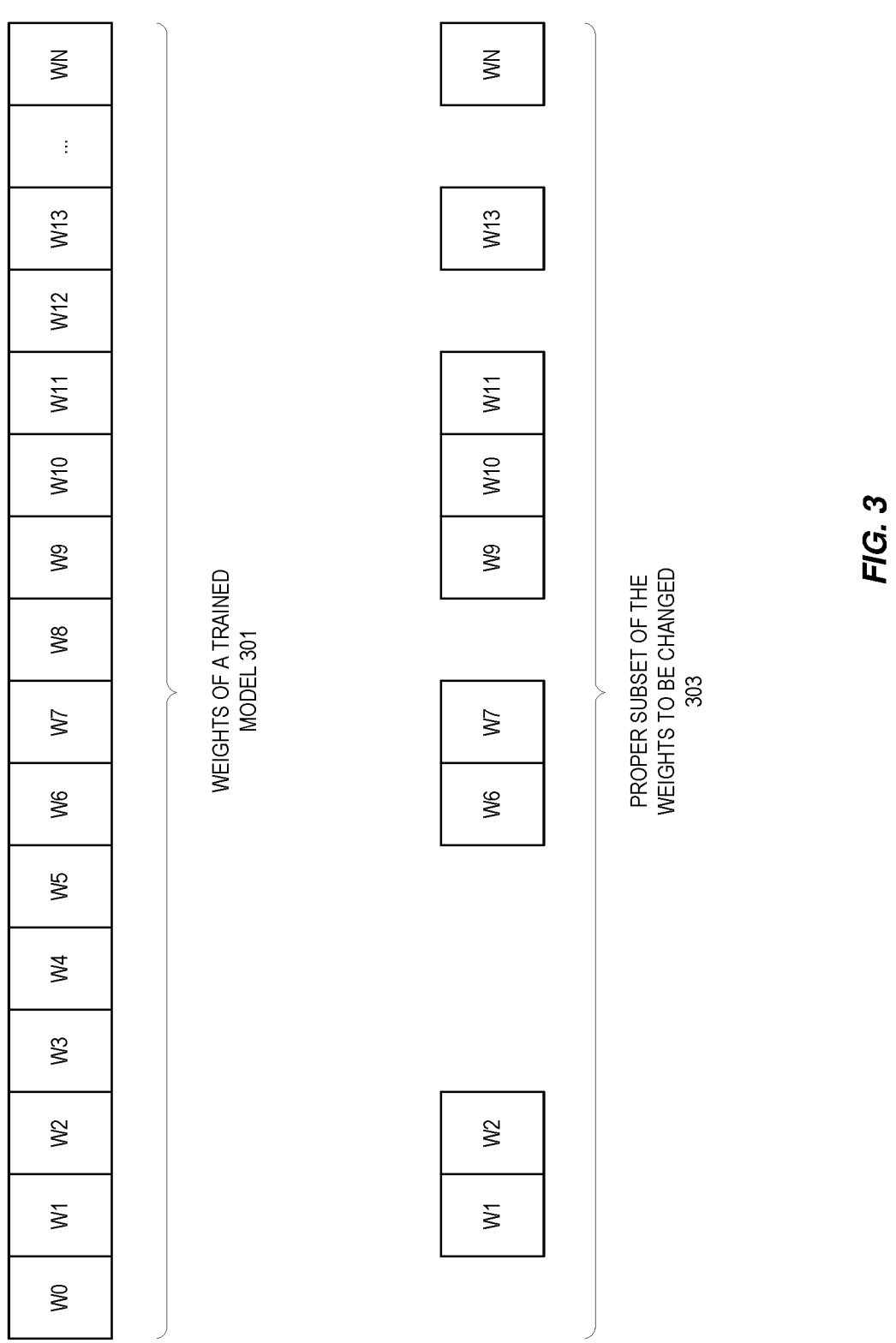
FIG. 3 illustrates examples of weights before and after a proper subset to use in optimization has been determined.

FIG. 3 illustrates examples of weights before and after a proper subset to use in optimization has been determined. In this example, the weights are shown as an array or vector, but other arrangements may be used. As shown, the weights of a trained model 301 include 0 . . . . N values. However, not all of those weights will be used in the optimization as shown in the example proper subset of the weights 303.

FIG. 2(C) illustrates examples of model training wherein a proper subset of weights may be marked as to be updated during training. As shown, a model definition 215, a training dataset 211, and, in some examples, an indication of a proper subset of parameters to update 209 are provided to a model optimizer 116 and/or model training service 110 to generate a second model 213. In some examples, the model optimizer 116 utilizes a variant of stochastic gradient descent (SGD) or adaptive moment estimation (Adam) optimization methodology.

FIG. 2(D) illustrates examples of model optimization wherein a proper subset of weights is to be updated. As shown, the second model 213, a training dataset 211, and an indication of a proper subset of parameters to update 209 are provided to the model optimizer 116 to generate an optimized model (second model* 217). In some examples, the model optimizer 116 utilizes a variant of stochastic gradient descent (SGD) or adaptive moment estimation (Adam) optimization methodology. Note that the optimization and parameter selection may happen multiple times—that is for each optimization a new set of parameters is selected.

FIG. 4 illustrates examples of a graphical user interface to be used by a user to request optimization of a ML model. As shown, a graphical user interface (GUI) to interface with the model training service may include several fields. A first set of fields is for sources 401. In this illustration, a user provides a location of a model or model definition to be optimized (e.g., via path such as a URL) and a location of training data to be used in the optimization. Note that in other examples the model and/or training data are more directly provided.

A second set of one or more fields is for the destination (or target) 403. This set of one or more fields is used to define the target. A destination location for the optimized model is to be provided (e.g., via path such as a URL). Depending on the example, one or more other fields may also be used. In some examples, a user provides a value or percentage of the number of parameters to be changed. In other examples, this is determined by the provider network service. In some examples, an optimization type (e.g., variant of Adam or SGD) is provided by a user. In other examples, this is determined by the provider network service. In some examples, an accuracy threshold is provided. This allows for a user to define when to stop. In other examples, this is determined by the provider network service.

Other fields that may be present include one or more of a field to input a number of iterations of training to perform, a field to allow for an indication of an algorithm to use to select parameters (e.g., absolute value, distribution based, etc.), a field to allow for an indication of criteria for selecting parameters (e.g., thresholds of data values, etc.), a field to allow for an indication of if selective node disablement should be used (e.g., in a distributed training environment if a node does not have selected parameters it is not involved in the optimization), etc.

A third set of one or more fields that are present in some examples is for the compute instance(s) to use for optimization 405. For example, what operating system to use and/or processing hardware to use. In some examples, a field defining an end target operating environment (e.g., ARM, ×86, NVIDIA, etc.) for the model is provided.

FIG. 5 is a flow diagram illustrating operations of a method for at least optimizing a ML model according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the model training services 102 of the other figures. Note that the optimization may be used for HPO.

In some examples, a first ML model is trained on a first source dataset at 500. Note that in some examples the first ML model is user generated and in other examples is provided by a provider network.

In some examples, a second ML model is trained on a second source dataset at 501. The source dataset is typically different than the first source dataset.

A request to optimize the second trained ML model is received at 502. In some examples, the request includes one or more of an identification of a location of a ML model to optimize, a ML model to optimize, an indication of a type of optimization to perform, an indication of a stopping threshold (e.g., loss and/or accuracy), an indication of an optimizer type (e.g., stochastic gradient-based or not), a number of iterations of training to perform, an indication of an algorithm to use to select parameters, an indication of criteria for selecting parameters, an indication of selective node disablement should be used (that in a distributed training environment if a node does not have selected parameters it is not involved in the optimization, and/or an identification of a location to store an optimized model.

A determination of which weights of the second trained ML model to update (while the rest are locked) is made at 504. In some examples, this determination includes generating a distribution of weights of the first trained ML model at 506 and sampling the sample the weights (based on the distribution) at 508. Other ways of making the determination have been detailed above.

The second trained model is optimized, by updating the determined weights and locking the other weights, using a second source dataset at 510. In particular, the determined weights are trained on the second source dataset. The optimization may be based on SGD, Adam, etc.

In some examples, a determination is made of if a stopping criteria has been reached is made at 511. For example, has a loss and/or accuracy threshold been met, or have the desired number of iterations of training been performed, etc.

In some examples, the optimized model is stored at 512. In some examples, the request indicates where to store the optimized model.

Figure 6:
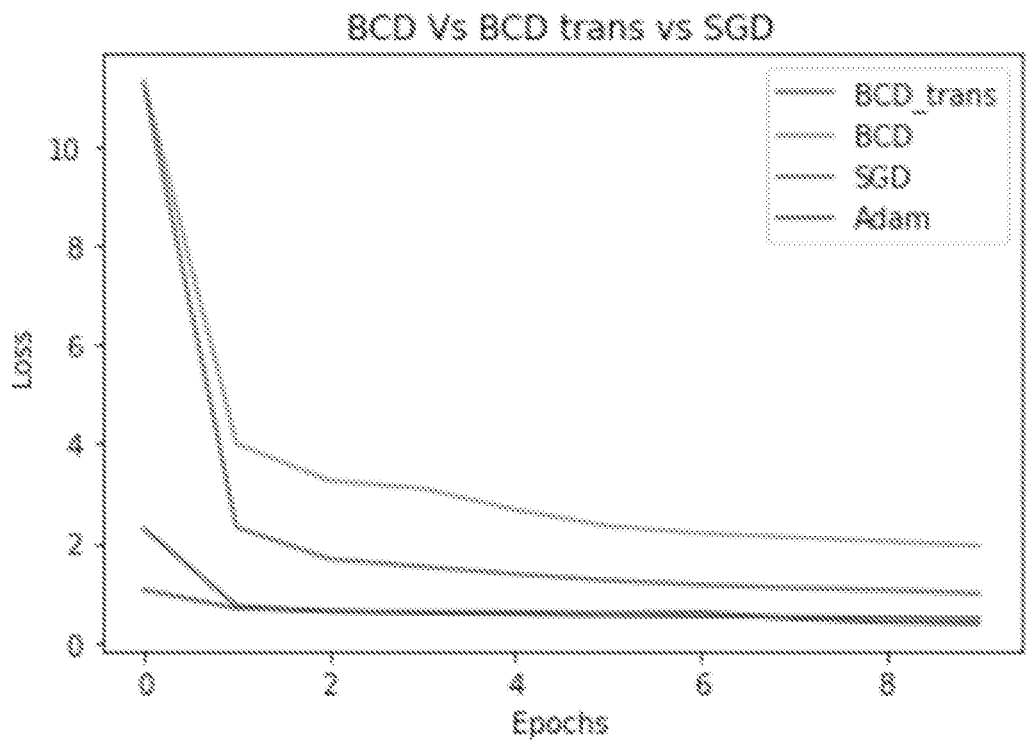
FIG. 6 illustrates examples of a benefit of the above discussed optimization approach.
Figure 7:
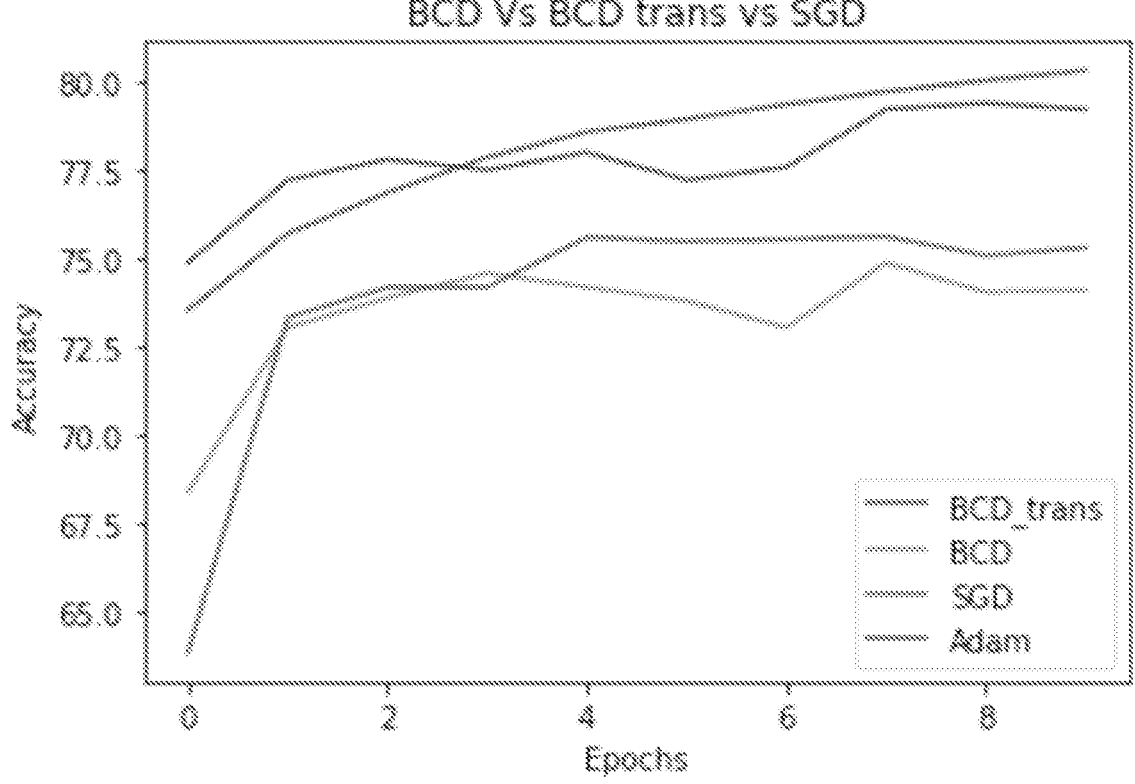
FIG. 7 illustrates examples of a benefit of the above discussed optimization approach.

Information regarding the optimization with respect to other techniques is generated and provided at 514 in some examples. FIGS. 6 and 7 illustrate examples of such information.

FIG. 6 illustrates examples of a benefit of the above discussed optimization approach. As shown, "BCD_trans" aligns with the described optimization approach. This chart shows that a training loss convergence is quickly found compared to normal transfer learning or SGD.

FIG. 7 illustrates examples of a benefit of the above discussed optimization approach. As shown, "BCD_trans" aligns with the described optimization approach. This chart shows that the accuracy of a model optimized as above improves at a better rate than traditional transfer learning, SGD, or Adam.

Figure 8:
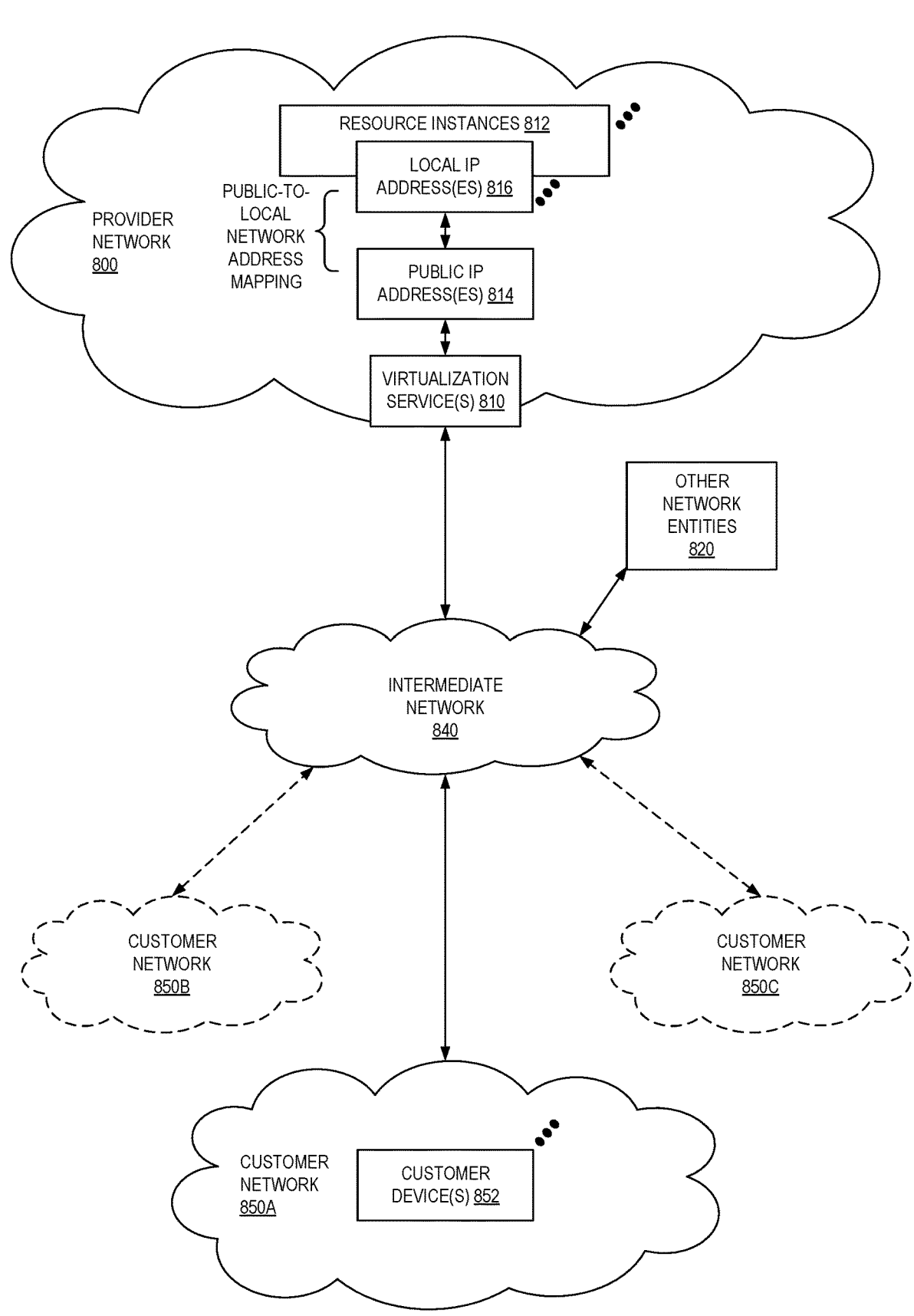
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
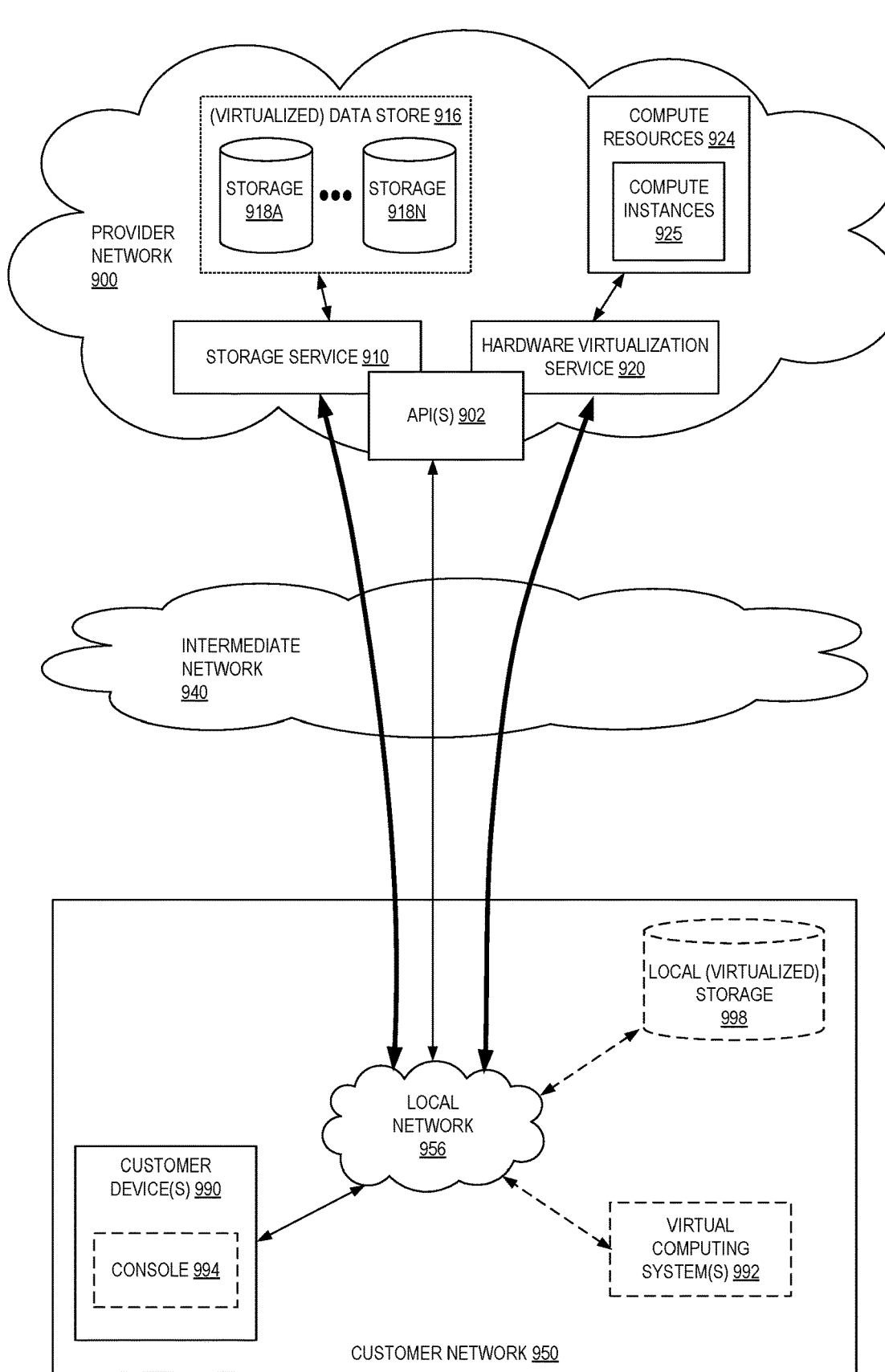
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
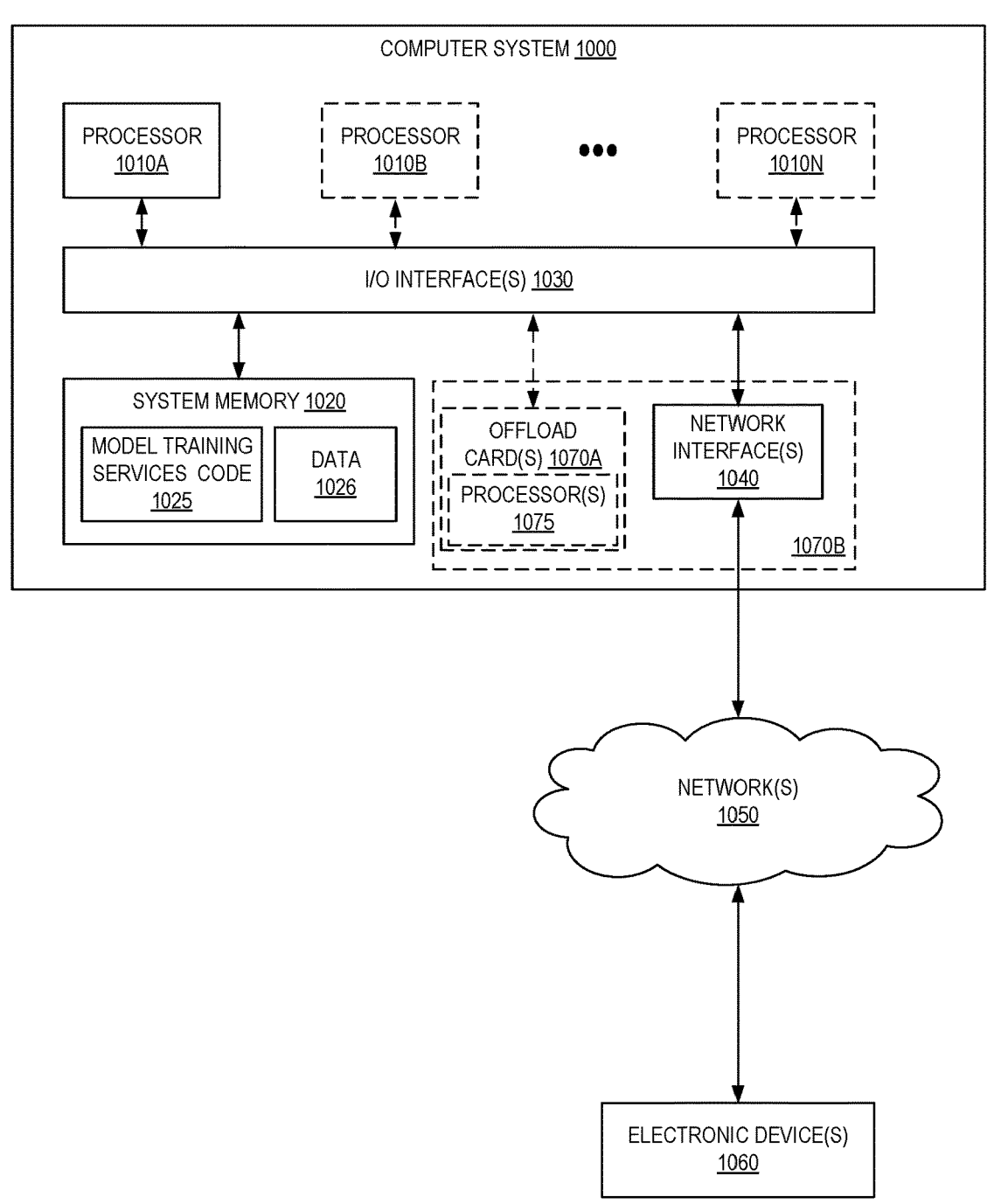
FIG. 10 is a block diagram illustrating an example computer system that can be used in some examples.

In some examples, a system that implements a portion or all of the techniques described herein can include a general-purpose computer system, such as the computer system 1000 illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as model training services code 1025 (e.g., executable to implement, in whole or in part, the model training services 102) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and cannot coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A method comprising:
in a provider network,
receiving a request to generate an optimized machine learning (ML) model;
determining, by a model training service of a provider network implemented as model training services code stored in memory and executed by one or more processors of the provider network, a proper subset of weights of a first trained ML model to change during an optimization procedure by generating a distribution of the weights of the first trained ML model and sampling the distribution of the weights based on the distribution, wherein a number of the weights in the proper subset of weights is set by the model training service;
updating only the proper subset of weights of a second trained ML model on a first source dataset to generate an optimized ML model; and
storing the optimized ML model according to the request.

2. The computer-implemented method of claim 1, wherein the first source dataset relates to a same task as a dataset used to train the second ML model to be optimized.

3. The computer-implemented method of claim 1, wherein the request includes one or more of an identification of a location of a ML model to optimize, a ML model to optimize, an indication of a type of optimization to perform, an indication of a stopping threshold, an indication of a number of training iterations to perform, an indication of a criteria for selecting weights, an indication of an algorithm to use to select parameters, and an identification of a location to store an optimized model.

4. A computer-implemented method comprising:

determining, by a model training service of a provider network implemented as model training services code stored in memory and executed by one or more processors of the provider network, a proper subset of weights of a first trained machine learning (ML) model to change during an optimization procedure by generating a distribution of the weights of the first trained ML model and sampling the distribution of the weights based on the distribution, wherein a number of the weights in the proper subset of weights is set by the model training service;

updating only the proper subset of weights of a second ML model on a first source dataset to generate an optimized ML model; and storing the optimized ML model.

5. The computer-implemented method of claim 4, further comprising training the first ML model on a second dataset.

6. The computer-implemented method of claim 5, wherein the second dataset is larger than the first source dataset.

7. The computer-implemented method of claim 4, wherein the determining a proper subset of weights of a first trained ML model to change during an optimization procedure comprises:

generating a distribution of weights of the ML model; and sampling the weights based on the distribution to generate the proper subset of weights.

8. The computer-implemented method of claim 4, wherein the first source dataset relates to a same task as a dataset used to train the second ML model to be optimized.

9. The computer-implemented method of claim 4, wherein a number of weights in the proper subset is set by a service of a provider network.

10. The computer-implemented method of claim 4, further comprising receiving a request to optimize the second ML model, wherein the request includes one or more of an identification of a location of a ML model to optimize, a ML model to optimize, an indication of a type of optimization to perform, an indication of a stopping threshold, an indication of a number of training iterations to perform, an indication of a criteria for selecting weights, an indication of an algorithm to use to select parameters, and an identification of a location to store an optimized model.

11. The computer-implemented method of claim 10, wherein the request further comprises an indication of a number of weights to be sampled.

12. The computer-implemented method of claim 4, wherein the updating only the proper subset of weights of the second ML model on a first source dataset to generate an optimized ML model uses a variant of adaptive moment estimation.

13. The computer-implemented method of claim 4, wherein the updating only the proper subset of weights of the second ML model on a first source dataset to generate an optimized ML model uses a variant of stochastic gradient descent.

14. The computer-implemented method of claim 4, further comprising generating and providing information regarding the optimizing in comparison to other optimization techniques.

15. A system comprising:

a first one or more electronic devices to implement a storage service in a multi-tenant provider network; and a second one or more electronic devices to implement a model optimizing service in the multi-tenant provider network, the model optimizing service implemented as model optimizing service code, stored in memory, that upon execution by one or more processors of the provider network cause the model optimizing service to:

determine a proper subset of weights of a first trained machine learning (ML) model to change during an optimization procedure by generating a distribution of the weights of the first trained ML model and sampling the distribution of the weights based on the distribution, wherein a number of the weights in the proper subset of weights is set by the model optimizing service;

update only the proper subset of weights of a second ML model on a first source dataset to generate an optimized ML model; and store the optimized ML model.

16. The system of claim 15, further comprising a training service to train the first trained ML model.

17. The system of claim 15, further comprising a model hosting service to host the optimized ML model.

18. The system of claim 15, wherein the model optimizing service is to receive a request to optimize the second ML model, wherein the request includes one or more of an identification of a location of a ML model to optimize, a ML model to optimize, an indication of a type of optimization to perform, an indication of a stopping threshold, an indication of a number of training iterations to perform, an indication of a criteria for selecting weights, an indication of an algorithm to use to select parameters, and an identification of a location to store an optimized model.

19. The system of claim 18, wherein the request further comprises an indication of a number of weights to be sampled.

20. The system of claim 15, wherein the update only the proper subset of weights of the second ML model on a first source dataset to generate an optimized ML model is to use a variant of adaptive moment estimation.

* * * * *